United States Patent [19]

Navratil et al.

[11] 4,129,772

[45] Dec. 12, 1978

[54] ELECTRODE STRUCTURES FOR HIGH ENERGY HIGH TEMPERATURE PLASMAS

[75] Inventors: Gerald A. Navratil; George R. Neil, both of Madison, Wis.

[73] Assignee: Wisconsin Alumni Research Foundation, Madison, Wis.

[21] Appl. No.: 731,801

[22] Filed: Oct. 12, 1976

[51] Int. Cl.[2] .................................................. B23K 9/00

[52] U.S. Cl. ............................. 219/121 P; 219/121 L; 176/2; 313/231.3; 60/509

[58] Field of Search ..... 219/121 P, 121 EB, 121 EM; 176/1, 2, 6, 9; 313/231.3, 61.5, 231.5, 167; 315/111.2, 111.7; 204/154.2; 60/509, 203

[56] References Cited

U.S. PATENT DOCUMENTS

| | | | |
|---|---|---|---|
| 2,920,236 | 1/1960 | Chambers et al. | 176/2 |
| 3,007,030 | 10/1961 | Ducati | 219/121 P |
| 3,021,272 | 2/1962 | Baker et al. | 313/231.3 X |
| 3,414,702 | 12/1968 | Stauffer | 219/121 EB |
| 3,463,957 | 8/1969 | Fuksiewicz | 313/231.5 |
| 3,521,106 | 7/1970 | Hess | 313/231.5 X |
| 3,624,239 | 11/1971 | Fraas | 176/1 |
| 3,790,742 | 2/1974 | Auer | 219/121 P |
| 3,806,698 | 4/1974 | Hare et al. | 219/121 P X |
| 3,935,504 | 1/1976 | Guillareux et al. | 176/1 X |
| 3,993,910 | 11/1976 | Parkin et al. | 313/61.5 |

FOREIGN PATENT DOCUMENTS

| | | | |
|---|---|---|---|
| 2411667 | 9/1975 | Fed. Rep. of Germany | 176/1 |

OTHER PUBLICATIONS

"High-density Fusion and Z-pinch", Hartman et al. cited as prior art by applicant Lawrance Livermore Lab., pp. 653-661.

*Primary Examiner*—J. V. Truhe
*Assistant Examiner*—Mark Paschall
*Attorney, Agent, or Firm*—Howard W. Bremer

[57] ABSTRACT

A plasma focus electrode is described which utilizes a cylindrical hollow conductive anode having a concentric cylindrical insulator. This anode is used in conjunction with a lithium vortex cathode in the formation of a plasma focus for the liberation of neutrons from a plasma at the focus.

5 Claims, 7 Drawing Figures

ELECTRODE STRUCTURES FOR HIGH ENERGY HIGH TEMPERATURE PLASMAS

BACKGROUND OF THE INVENTION

This invention relates to the formation and control of a high temperature, high energy plasma and more particularly to an electrode structure which allows the formation and focusing of such plasmas for production and control of energy.

The use of high energy, high temprature plasmas has become more prevalent with development of technologies such as magnetohydrodynamics and nuclear fusion; it has become advantageous to generate such plasmas, to produce energy and neutrons from them and to control reaction products derived therefrom, by means of plasma focus technology.

One means that has been contemplated for control of plasmas is "Z pinch" type thermonuclear reactor. In one such reactor, a neutron moderating blanket, formed of a liquid lithium vortex, is caused to swirl concentric about a hollow electrode. To form the pinch, solid or liquid may be injected through the electrode to cause an arc to occur between the electrode and bottom of the vortex of lithium. Deuterium/Tritium fuel may then be injected along the electrode axis, forming a Z pinch in the vortex between the inserted electrode and the lithium blanket which serves as a return conductor. The plasma Deuterium/Tritium fuel in the pinch is electrically energized by an arc sufficient to cause liberation of neutrons from the fuel plasma located in the pinch.

Plasma focus reactors on the other hand, utilize a moving electric discharge to compress the fuel plasma and to concentrate the plasma at a particular location, i.e., a focus, where the compression also achieves adiabatic compression of the fuel plasma. Such adiabatic compression with anomalous ion heating, achieved in pulselike successions, causes the liberation of neutrons from the plasma in the focus.

The utilization of Z-pinch or plasma focus reactors which employ a lithium vortex yield several advantages. It has been suggested that, because such structures can confine fuels at high temperature without continuous strong magnetic fields used in other reactor designs, high costs associated with the production of such fields are reduced by the provision of the lithium blanket that effects containment. The lithium blanket also breeds tritium when absorbing the neutrons liberated in either the "pinch" or the focus; tritium so produced is a useful byproduct, forming a portion of the Deuterium/Tritium fuel used by itself. The lithium blanket is also efficient at converting the kinetic energy of the liberated neutrons into recoverable heat and is stable against structural failure and corrosion at operating temperatures under neutron irradiation.

Plasma focus reactors also promise enhanced liberation of neutrons as well, and have been able to liberate many orders of magnitude more neutrons from the plasma fuel than either magnetic containment reactors, Z-pinch reactors, or laser fusion reactors. Although ion heating mechanisms and subsequent neutron production in a dense plasma focus is not yet well understood, formation of a plasma focus can be predicted using existing two dimensional magnetohydrodynamic (MHD) simulation. Imshennik et al[1] have been able to derive a proportionality formula for neutron yield in plasma focus reactors that assumes constant source inductance for a plasma focus. Such a formulation is shown in equation 1.

$$W \sim C^{-1/14} \times E^{22/7} \quad \text{(Eq. 1)}$$

(1) V. S. Imshennik, N. W. Fillipov, T. I. Filippova, Nucl. Fusion 13 (1973)

In this equation W is the neutron yield, C is the capacitance of a capacitive discharge bank powering the focus and E is the stored energy. For a focus producing a 10 megajoule liberation of thermal neutrons, with a capacitance C of about 500 $\mu$F at 200 kilovolts, the equation would predict in the range of $4 \times 10^{16}$ neutrons per pulse using deuterium in the focus. It is believed that the yield may be increased by a factor of 100 if a larger cross-section Deuterium/Tritium reaction is exploited in the focus. A yield of $4 \times 10^{18}$ reactions of a 17.58 eV energy reaction corresponds to greater than 10 megajoules product per pulse, particularly considering possible energy multiplication in a lithium blanket from the product of tritium via the $Li^6(n, \alpha)H^3$ reaction or any of the other energy multiplication schemes, for example, such as have been described by Lidsky[2].

(2) L. N. Lidsky, Nucl. Fusion 15 (1975) 151.

A plasma focus reactor has several practical advantages over other proposed fusion reactor schemes. Aside from being the most prolific source of fusion neutrons extant and exhibiting encouraging scaling with increasing energy input, it represents a significant decrease in the basic plant capital cost. In contrast to magnetic containment such as a tokamak reactor schemes, it requires no large and expensive cryogenic magnet assemblies which are as yet undeveloped. It, also, requires no high power, high repetition rate lasers as in the laser fusion schemes. Geometry considerations favor the focus in terms of both shielding and maintenance. The liquid lithium outer electrode and neutron blanket suffers no structural radiation damage and the central electrode structure can be adequately shielded and easily replaced when necessary. This is in contrast to the tokamak reactors, which would require periodic replacement of the inside liner of a toroidal vacuum vessel, as well as the laser reactors, which require the replacement of the inner surface of a spherical vacuum chamber. The high power density of the focus lends itself to a very compact nuclear island with resulting small size yielding savings both in materials and biological shields. Finally, the high voltage, high energy capacitor bank which would power a focus reactor is an easily achievable application of presently existing technology.

A further drawback encountered in plasma containment schemes which utilize magnetic fields generated by cryogenic magnets for plasma containment is the formation of radioactivity in solid containment walls and resulting structural weakness therein caused by the bombardment thereof by thermal and fast neutrons. Of course, as the density of liberated neutrons increases, these effects become more severe, and pose serious drawbacks to the creation of any large-scale exotermic fusion reactors. Z-pinch and plasma focus reactors also are susceptible to radiation damage of their anode structures, the Z-pinch reactors having a larger problem in this regard as neutrons are propagated from a larger volume than from the relatively smaller volume of the focus where neutrons ar liberated in focus reactors.

SUMMARY OF THE INVENTION

This invention comprises a structure which provides a plasmafocus electrode that has as one of its objects the increased liberation of thermal neutrons useful for thermal transfer, as in heating fluids or the injection of reaction products into a heated gaseous stream, and in general, the transfer of heat to a fluid or gaseous medium.

Another object is to provide a structure that eliminates the need for magnetic fields generated by cryogenic magnets.

A further object of the invention is to provide electrode structures less susceptible to radiation damage and less susceptible to the electrode metal decay caused by arcs associated with the electric field used for forming a plasma focus.

A further object is to provide an electrode arrangement capable of precise focusing of plasma and shieldng the neutron radiation so that structural radiation damage is minimized.

Another object of the invention is to provide a structure that enables the recovery of tritium as a reaction byproduct, achieving greater economy in the operational cycle which utilizes a Deuterium/Tritium fuel.

The invention provides a mechanism for capture of the reaction products by the use of a vortex of liquid lithium similar to that described by Fraas et al[3]. Gas bubbles introduced into liquid lithium help absorb blast shock and the lithium vortex may additionally serve as the outer electrode of a Filipov type focus device avoiding high current and radiation damage problems associated with a solid outer electrode. Lithium vapor pressure, while imposing a limit on operating temperature, does not pose a serious drawback. For example, it is believed that the focus device of this invention can be operated at 500° C with less than 1% lithium impurity in a Deuterium/Tritium field mixture at a pressure of about 10 mm Hg.

(3) A.P. Fraas, L. Dresner, R. S. Holcomb and M. E. Lacky, "Analytical and Experimental Investigation of the Blascon Energy Conversion System for Laser-Fusion Reactors," Proc. ASME, 72-WA/ENGR 10, New York (Nov. 1972).

BRIEF DESCRIPTION OF THE DRAWINGS

Further objects and advantages of the invention will be apparent from the following detailed description of a preferred embodiment in conjunction with accompanying figures in which.

In the drawings illustrating the invention, identical numbers refer to identical or equivalent structure throughout the several aforementioned views.

The particular embodiment shown relates to reactors utilizing a Deuterium/Tritium fuel for forming a high energy/high temperature plasma at a plasma focus. Because such controlled neutron releasing reactions depend on nuclear collision, extermely high temperatures must be reached for useful power to be obtained, while losses at these temperatures due to radiation become significant. Since Deuterium and Tritium release energy at relatively low temperatures (approximately 10 KeV), they are particularly suitable thermonuclear fuels.

DESCRIPTION OF A PREFERRED EMBODIMENT

Figure 1:
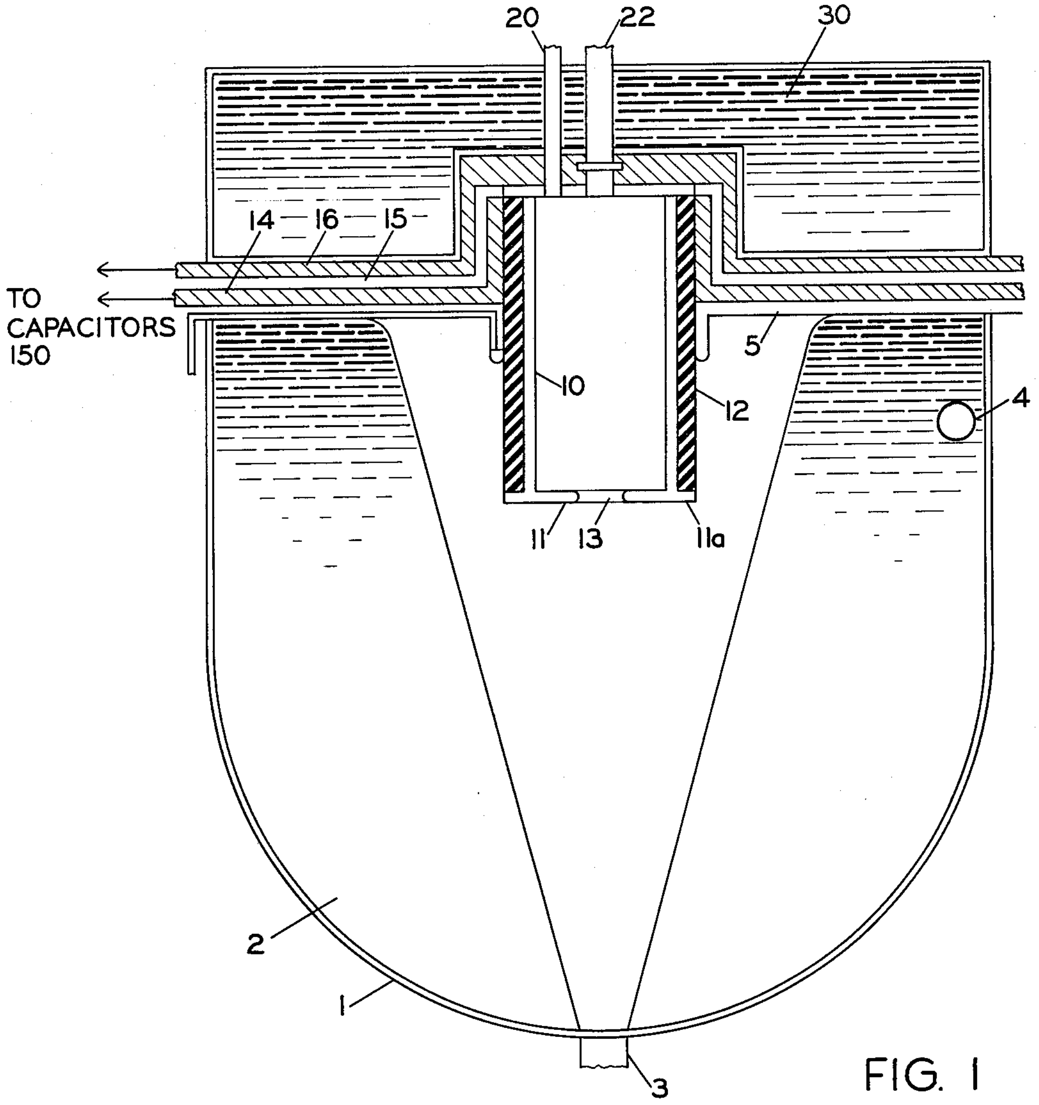
FIG. 1 illustrates in cross-section a plasma reaction vessel incorporating the focus electrode of the invention.

A schematic of the electrode structure of the invention together with associated structure is shown in FIG. 1. In this illustration, a cylindrical vessel 1 is shown containing a vortex of lithium 2, the apex of which is coincident with a reaction product outlet 3. A tangential lithium input 4 is provided about the side of vessel 1 for creation of the liquid lithium vortex 2 adjacent the wall of the vessel 1. Introduction and pumping of liquid lithium through input 4 causes swirling motion of the liquid contained in the vessel 1 resulting in a vortex. At the upper portion of the vessel 1 is located a hollow metal anode 10 cylindrically shaped whose major axis of rotation is coaxial with the axis of rotation of the lithium vortex. At one end of the cylindrical anode 10 is a flat annular electrode configuration 11 which contains an aperture 13 through which a Deuterium/Tritium gas-mixture may be injected into the vortex area from the interior of the hollow anode. The outer diameter of the annular configuration 11 is larger than the outer diameter of the cylindrical anode 10, so that a ridge or lip **11*a* is seen to extend outwards of cylindrical anode 10. Arranged about the anode 10 is a cylindrical shield or insulator 12 which is disposed between the annular electrode 11 and the end 10*b* opposite thereto of the anode 10. At the end of the electrode 10 opposite aperture 13 is a port 20 for the admission of Deuterium and Tritium gas and a port 22 for allowing the focusing of a laser beam if desired onto the gas through aperture 13. The laser may be focused at the plasma focus which is constrained to be between outside of the annular electrode 11 and between it and the liquid lithium vortex 2. The anode 10 is also insulated from the liquid lithium by means of an insulator 14 and 16. Electrodes 15 and 5 are arranged on opposite sides of insulator 14. Across these electrodes a capacitance bank is discharged to cause the acceleration and focus of the plasma. Electrode 5 contacts the lithium vortex, while the electrode 15 is connected to the hollow anode 10. For radiation protection a supplementary lithium blanket 30 is provided at the upper region of the vessel 1** above the focusing electrode arrangement.

The hollow anode structure of the invention particularly reduces arc-induced metal decay as well as the cost of refurbishing such structures. The hollow anode 10 is surrounded along its length by a removble sheath 12 of insulating material; since such structures can be made removable, the entire assembly of anode 10 and insulator 12 may be removed and the damaged insulator 12 may be replaced and the assembly reinstated in the reaction vessel 1. Placement of a sheath-like outer insulator 12 about the length of anode 12 reduces the anode exposure to arc and radiation damage.

Figure 1A:
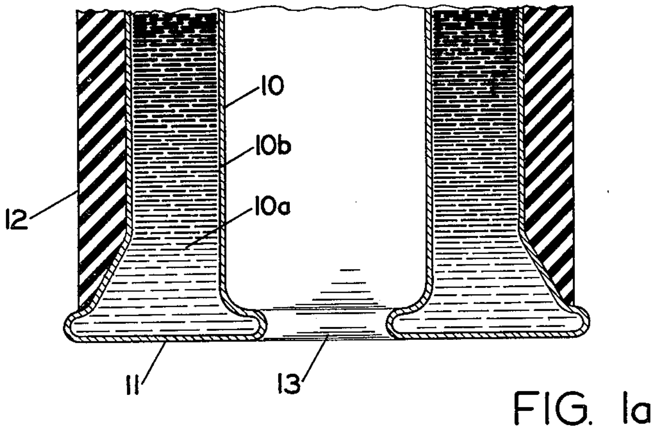
FIG. 1*a* shows alternative structure for anode configurations shown in FIG. 1

In furtherance of protecting the conduction portion of the anode 10, it may be useful to provide, in addition to the insulator 12, liquid cooling fluid for the electrode which has neutron absorbing and slowing properties such as lithium hydride mixed with a high Z inelastic scattering material such as lead. Such a coolant may be circulated within th conducting portion 10 as shown in FIG. 1*a*. Such a provision may be preferable since materials useful as electrical insulators, as would be provided in insulator structure 12, are ineffective at heat transfer. Preferably, if the anode 10 is to be liquid cooled, the thickness of the cylindrical portion surrounded by insulator 12 should be increased as is shown in FIG. 1*a* to effect adequate shielding of the insulator, that is, the volume 10*a* should be large enough to give a thickness sufficient to slow and absorb the neutrons liberated at the focus.

Figure 2:
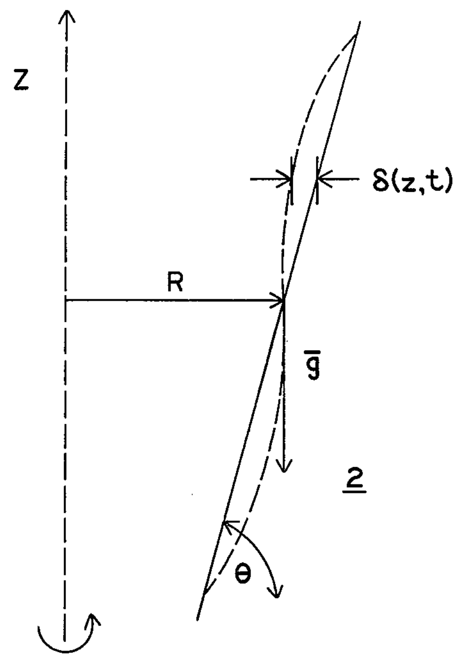
FIG. 2 illustrates a portion of the lithium vortex 2 illustrated in FIG. 1.

The operation of the invention together with design consideration for the structure shown will not be described. Referring to FIG. 2, the vortex is formed of a liquid having an angle $\theta$ between a line tangent to the surface of the vortex and a horizontal plane is given by:

$$\theta = \tan^{-1}(V^2/gR) \qquad \text{(Eq. 2)}$$

R is the radius from the vertical cylindrical axis of symmetry of the vortex, g is the gravitation acceleration constant, and V the velocity of the fluid at the given radius R. From FIG. 2 it can be seen that $\theta$ can be kept constant along the surface of the vortex by adjusting the velocity at the height z of the vortex so as to keep the ratio $V^2/gR$ a constant. In the case of a lithium vortex focus (LVF) $\theta \geqq 70°$ tend to keep the radius R relatively constant over the region adjacent to the center electrode structure 10. For an angle $\theta$ of 75° and R being approximately one meter, the relationship shown in FIG. 2 requires a fluid velocity of around six meters per second. For a low density liquid such as lithium which has a density of about 0.5 gm/cc such a velocity as necssary can be maintained by presently available pumping technology.

One of the primary concerns in using a liquid metal vortex as outer electrodes in plasma focus devices is that such a vortex should not be interrupted by the large magnetic pressure impulse delivered to the vortex during the discharge of the capacitance bank for producing accleration and focus of the plasma. Relating to this problem, FIG. 2 also describes a small perturbation $\delta$ which is the function of z and time on the equilibrium radius which is also a function of the height z in a vortex where $\theta$ is a constant. If the resulting equation is linearized, the following relationship is obtained. This relationship is given in equation 3.

$$\frac{\partial^2\delta}{\partial t^2} = -\frac{g \tan\theta\delta}{R} - \frac{g \cos\theta}{1+(\cot\theta)^2}\cdot\frac{\partial\delta}{\partial z} \qquad \text{(Eq. 3)}$$

In a very steep vortex where the angle $\theta$ is around 70° or greater the second term on the right hand side of the equation 3 is negligible compared with the first term and the remaining equation approaches the decriptive mathematics for a harmonic oscillator whose frequency is given by equation 4.

$$f = \frac{1}{2\pi}\sqrt{\frac{g \tan\theta}{R}} \qquad \text{(Eq. 4)}$$

For $\theta = 75°$ and a radius R of one meter, the solution of equation 4 yields a frequency of about $1H_z$. This indicates that if a device were fired with the frequency much greater than or much less than once a second no harmonic excitation of the vortex should occur.

It can also be shown that the displacement induced by the magnetic impulse from the discharge of the capacitor bank causes only a small perturbation on the radius of the vortex. If the capacitor bank for a particular discharge were set at 500 microfarads at 200 kilovolts and a discharge time of 5 mircoseconds is achieved at the focus, an average current of about $2 \times 10^7$ amperes would be distributed around the circumference of the vortex at the radius of 1 meter. Such current would generate a magnetic field of about 4 Tesla at the surface of the vortex which would result in a magnetic pressure of about $6.4 \times 10^8$ n/m$^2$. Assuming of this pressure acts on the upper half of the vortex, the total force exerted is about $1.6 \times 10^8$ n for a period of about 5 microseconds. Such an impulse delivered to the lithium is then around 795 kg-m/sec or a kinetic energy of about 28.7 joules. For a small change in radius, the restoring force of the vortex is given as aproximately $mV^2\delta$ indicating a displacement in the lower half of the vortex of about 2-3 cm. This is small compared with the equilibrium radius and would not tend to disrupt the vortex itself.

In the operation of the liquid vortex contemplated in the invention the Deuterium/Tritium gas mixture cannot be static filled as usual with a solid cathode device, because of the large pumping capacity of any liquid lithium surface. Nearly all gas molecules striking such a surface will be buried in it. Such pumping will continue until the gas reaches an equilibrium concentration described by Sievert's Law in equation 5.

$$P = K(T)N \qquad \text{(Eq.5)}$$

P = partial pressure of the gas in mm Hg
N = mole fraction of solute
K(T) = Sievert's constant at temperature T Tabulated values of Sievert's constant as a function of temperature may be found in literature for various compounds of interest. For example, with lithium at 600° C Sievert's constant is 23.6. Assuming about 5 mm Hg pressure, an equilibrium mixture of Tritium implies N = 0.095. The device of the invention contains approximately 24 cubic meters of lithium having a density of 457 kilograms per cubic meter in a proposed embodiment. Thus, if allowed to reach equilibrium, the vessel 1 may contain about 1000 kilograms of Tritium. This is a very large radioactive inventory on the order of $10^{10}$ Curies and would present a serious containment problem. One solution is to use a pulsed charge of Deuterium/Tritium gas, delaying the electrical discharge until the gas is sufficiently diffused to form a coaxial snowplow discharge. Marshall gun plasma sources presently use such a technique. For example, chamber 1 may be filled with about 1 cubic meter of Deuterium/Tritium gas mixture at a pressure of 10 mm Hg firing twice a second and assuming a 50° C temperature drop across the primary coolant loop yields a lithium throughput of about 192 kilograms per second. With a 50-100% efficient Tritium scrubber located in the primary coolant loop, a Tritium inventory on the order of 400-200 grams appears possible. Tritium separators capable of handling such loads have been described in the art[5,6] with relation to Deuterium/Tritrium plasma reactions. A chemical separation scheme utilizing yttrium also appears promising and capble of handling such a load. Four such scrubbers could be placed in the primary coolant loop with only one valved in the system at a time. By switching from one to the other every hour, the recovered of tritium can be driven off by heating the srubbers not currently in the system. Tritium diffusion through metal walls can be handled with vacuum dewar construction and the use of a liquid sodium secondary coolant loop. Sodium has a low solutility for tritium and can be kept very clean to minimize contamination of the water in a stream turbine system.

([5]) B. Badger et al, A Wisconsin Toroidal Fusion Reactor Design, University of Wisconsin Fusion Design Memo 68, (November 1973).
([6]) J. S. Watson, "An Evaluation of Methods of Recovering Tritium from the Blanket or Cooling Systems of Fusion Reactors", ORNL-TM-3794, (July 1972).

Figure 3:
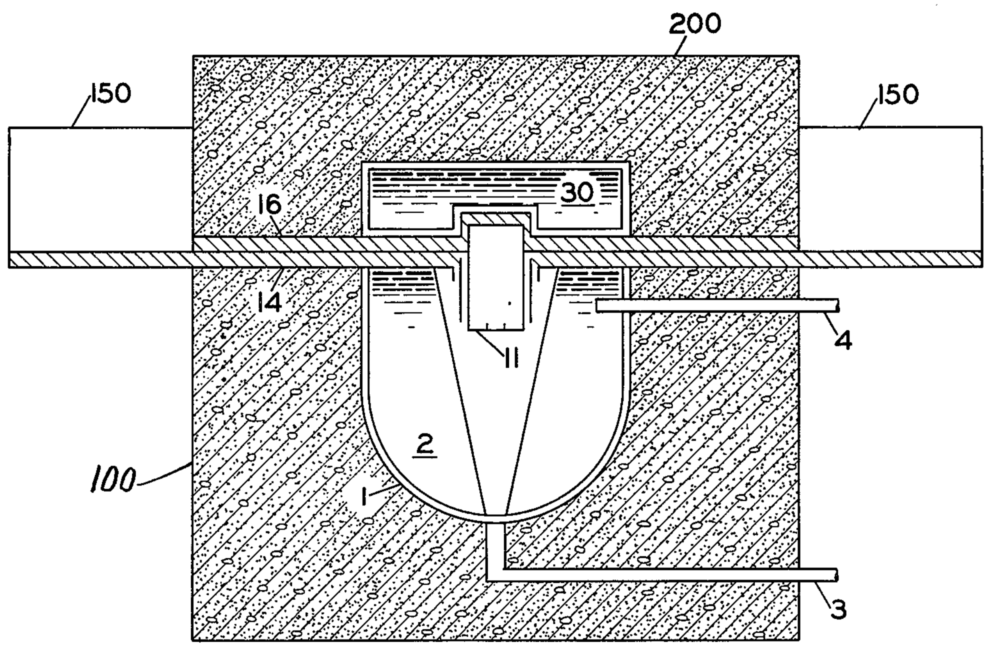
FIG. 3 shows further structures external to the vessel shown in FIG. 1.

The energy storage and discharge system required to create the electrified plasma may take the form of a full torus capacitor bank (such as that described by Thomas, Physics Jahoda, Sawyer and Siemon in physics of Fluids, Vol. 17 (1974), at p. 1344). Such a capacitance bank, for example, may store 7.3 megajoules in 15 sections each of 390 μF at 50 kilovolts and having section inductances of about 2nH. Such a bank may be arranged to operate at 200 kilovolts with the capacitor being the type used to store about 4-½ × $10^4$ joules per cubic meter. A 10 megajoule bank would require 230 cubic meters of volume formed in an annular ring height of 2 meters and an outer radius 8 meters around a 5 meter radius biological shield. Such a structure is shown in FIG. 3 enveloping the upper portion of the reaction vessel previously shown and described with reference to FIG. 1. The arrangement shown in FIG. 3 has extremely low inductance with the major inductance element in the overall reactor system consisting of the focus itself. Since the inductance of the coaxial focus is weak function of the radii of the inner and outer electrodes, the inductance of ths element remains roughly constant as the size of the device increases. Typical size and dimensions for the device described in this paragraph will be given for the structure illustrated in FIG. 3.

The structure illustrated in FIG. 3 includes cylindrical concrete shields 100 and 200 which encapsulate the vessel 2, and the electrodes 11, together with lithium blanket 30, and conductors 14 and 16, respectively. For the above-mentioned operational criteria of a device according to the invention, the preferable dimensions of shields 100 and 200 are given below.

Shield 200:
diameter: 10 m
height: 3 m
Shield 100:
diameter: 10 m
height: 6 m The power storage capacitance may be formed as a toroidal capacitance bank 100 surrounding the concrete shield 200, and may be of an inner diameter of 10 m, an outer diameter of 16 m, with a height of 2 m. A device according to the invention, therefore, can be seen to be substantially smaller than a magnetic confinement device having corresponding neutron yield.

Figure 6:
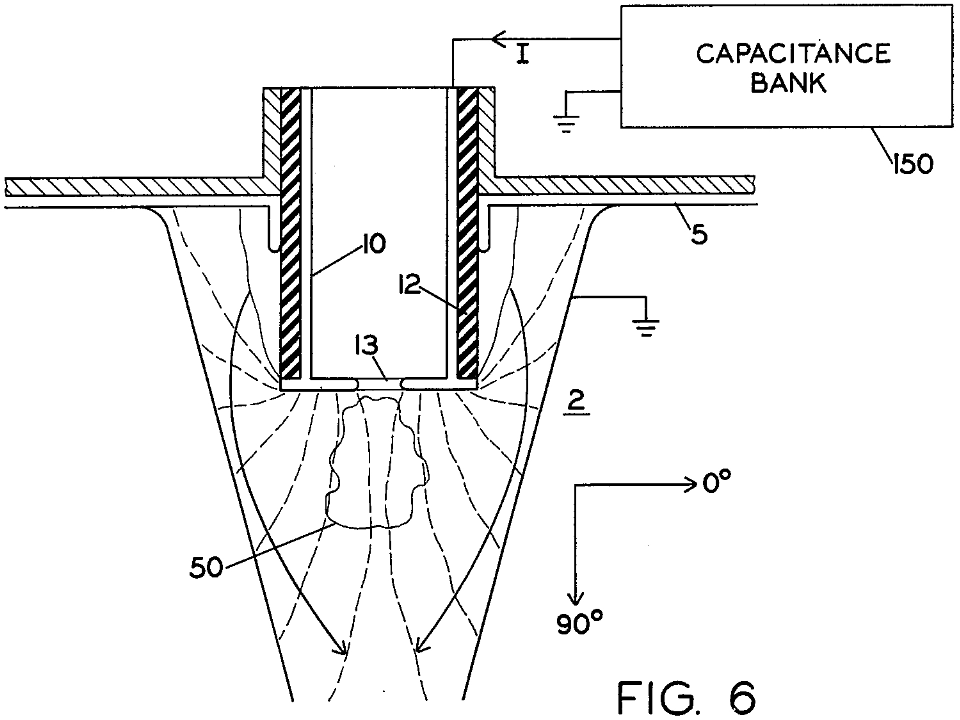
FIG. 6 illustrates the position and path of the plasma-focusing arc formed by the electrode structure of the present invention.
Figure 4:
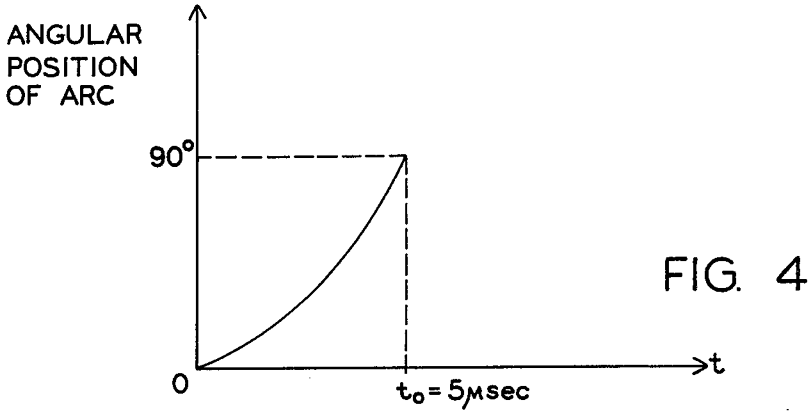
FIG. 4 shows the position of the plasma-forming arc in radians as a function of time in the illustration of FIG. 6.
Figure 5:
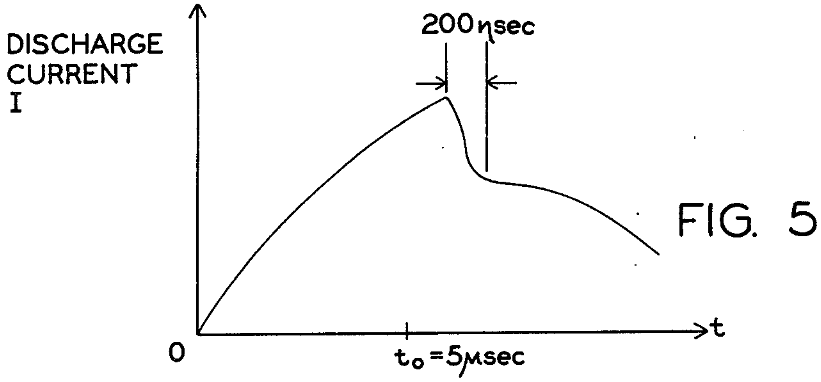
FIG. 5 shows the current value of the arc illustrated in FIGS. 4 and 6 as a function of time.

Referring now to FIGS. 4, 5 and 6, which illustrate the operative formation and utilization of a plasma focus, a gaseous discharge of a mixture of Deuterium and Tritium is introduced through the port 22 in the structure shown in FIG. 1. As the gas diffuses through the hollow anode 10, it exits from the interior thereof through aperture 13. Placement of the large voltage stored in capacitors between the anode 10 and the lithium vortex 2 as described above creates an arc between anode 10 and the conductor in contact with the lithium vortex 5 along the surface of the cylindrical insulator 12. Because the electrode structure is inductive, it, together with the capacitance bank, forms an LC circuit. Discharging the capacitors through the electrode therefore creates a rise in the current with time which flows between anode 10 and the lithium 2. As the level of the current increases, the arc is displaced from a position illustrated in FIG. 6 starting near the upper regions of the chamber, moving downwardly with increasing time and current level. The arc illustrated in FIG. 6 describes an angular displacement as shown while the current increases as illustrated in FIG. 4. The arcs on opposing sides of the chamber should converge near aperture 13 of the anode 10 at the time the diffused Deuterium/-Tritium gas 50 is localized near port 13. Because of these conditions, reaction occurs at the focus formed by converging arcs such that large numbers of fusion neutrons are liberated by the adiabatic compression and anomalous ion heating of the Deuterium/Tritium gas 50. Simultaneously the current is caused to decrease in a substantially stepwise fashion as shown in FIG. 5.

In order that the arc, th diffusing gases and the current maximum coincide at a time and position whereby the maximum number of neutrons is liberated, the travel of the arc may be slowed down by the introduction of an inert gas, such as argon, into the chamber 1 between the lithium vortex 2 and the anode 10.

As has been described, the displacement of the arc between electrode 10 and the liquid lithium 2 forms a current sheet, concentrates the diffused Deuterium/-Tritium plasma fuel 50 by sweeping it into a relatively narrow, highly dense focus. From such a focus, neutrons are liberated by the increasing thermal adiabatic compression of the plasma and anomalous ion heating. Because of the high concentration, neutron production is produced from what appears as a point source below the anode 10, causing irradiation only of the lip-like ridge 13, a small area by comparison to the overall anode electrode structure 10. Because maximum radiation damage is confined to the area of lip 13, the lip should preferably be made of a material which is electrically conductive, yet only slowly degrades under neutron bombardment while smoothly eroding. Preferable materials of suitable properties include Molybdenum and Tungsten alloys; those skilled in reactor physics will be aware of other suitable materials.

While a particular embodiment of the invention has been shown and described, various changes and modifications thereof may occur to those skilled in the art without departing from the spirit and scope of the invention as set forth in the following claims.

What is claimed is:

1. Apparatus for heating plasmas by plasma focusing, comprising:
(a) means for generating and containing a vortex of liquid conducting metal;
(b) an inner electrode mounted within and spaced away from said vortex of liquid conducting metal, said electrode having a substantially cylindrical portion whose major axis is coincident with the axis of rotation of said vortex, and an annular member having an aperture therein which is mounted on the bottom end of said cylindrical portion and electrically connected thereto, said inner electrode being electrically insulated from said liquid metal vortex;
(c) a substantially cylindrical insulator surrounding the cylindrical portion of said electrode and leaving said annular member substantially exposed, whereby when a selected high voltage is applied between said inner electrode and said liquid metal vortex, a sheet of electrical current discharge is formed between said annular member and said vortex which travels from the top end of said vortex to the bottom thereof to form a focus for plasma forming gas injected into the focus area through said aperture in said annular member.

2. The apparatus of claim 1 wherein the outer diameter of said annular electrode member is greater than the outer diameter of said cylindrical portion so as to form a ridge extending outward of said cylindrical portion at one end thereof.

3. The apparatus of claim 1 wherein said liquid metal is liquid lithium.

4. The apparatus of 1 wherein a circulating liquid metal coolant is provided within the inner electrode for the absorption of neutrons liberated at the focus.

5. The apparatus of claim 4 wherein said liquid metal coolant is liquid lithium.

* * * * *